(12) United States Patent
Chen et al.

(10) Patent No.: US 10,489,452 B2
(45) Date of Patent: *Nov. 26, 2019

(54) METHOD AND DEVICE FOR PRESENTING CONTENT

(71) Applicant: INTERDIGITAL MADISON PATENT HOLDINGS, SAS, Paris (FR)

(72) Inventors: Jianfeng Chen, Beijing (CN); Xiaojun Ma, Beijing (CN); Zhigang Zhang, Beijing (CN)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,285

(22) Filed: Sep. 11, 2018

(65) Prior Publication Data

US 2019/0005129 A1 Jan. 3, 2019

Related U.S. Application Data

(63) Continuation of application No. 14/369,712, filed as application No. PCT/CN2011/085183 on Dec. 31, 2011, now Pat. No. 10,078,690.

(51) Int. Cl.
*G10L 15/00* (2013.01)
*G10L 15/02* (2006.01)
*G06F 16/683* (2019.01)

(52) U.S. Cl.
CPC .......... *G06F 16/683* (2019.01); *G06F 16/685* (2019.01); *G10L 15/00* (2013.01)

(58) Field of Classification Search
CPC ............. H04N 21/812; H04N 21/2668; H04N 21/435; H04N 21/23424; H04N 21/4532; H04N 21/4622; H04N 21/25891; H04N 21/4316; H04N 21/44222; H04N 21/482; G10L 15/08; G10L 15/22; G10L 17/22;
(Continued)

(56) References Cited

U.S. PATENT DOCUMENTS

| 5,842,162 A * | 11/1998 | Fineberg | G10L 15/20 704/233 |
| 6,816,858 B1 | 11/2004 | Coden et al. | |
| 7,100,183 B2 | 8/2006 | Kunkel et al. | |

(Continued)

FOREIGN PATENT DOCUMENTS

| CN | 101425161 | 5/2009 |
| CN | 101916266 | 12/2010 |

(Continued)

OTHER PUBLICATIONS

Search Report Dated September 27, 2012.

*Primary Examiner* — Dwayne D Bost
*Assistant Examiner* — Stephen M Brinich
(74) *Attorney, Agent, or Firm* — Myers Wolin LLC

(57) ABSTRACT

It is provided a method for triggering an action on a second device. It comprises the steps of obtaining audio of a multimedia content presented on a first device; comparing the obtained audio with reference audio data in a database; if finding the obtained audio exists in the database containing reference audio, determining an action corresponding to the matched reference audio; and triggering the action in the second device.

12 Claims, 3 Drawing Sheets

(58) Field of Classification Search
CPC ......... G10L 2015/223; G10L 2015/088; G10L 15/02; G10L 15/00; G10L 15/265
See application file for complete search history.

(56) References Cited

U.S. PATENT DOCUMENTS

| | | | |
|---|---|---|---|
| 8,812,319 B2* | 8/2014 | Skerpac | G10L 17/005 704/246 |
| 2001/0001141 A1* | 5/2001 | Sih | G10L 15/20 704/231 |
| 2002/0083060 A1* | 6/2002 | Wang | G10L 17/26 |
| 2003/0021055 A1* | 1/2003 | Tange | G11B 19/02 360/72.1 |
| 2005/0004792 A1* | 1/2005 | Ando | G10L 15/02 704/217 |
| 2005/0111493 A1* | 5/2005 | Han | G11B 27/3027 370/509 |
| 2006/0212897 A1 | 9/2006 | Li et al. | |
| 2006/0277569 A1 | 12/2006 | Smith | |
| 2007/0078714 A1 | 4/2007 | Ott et al. | |
| 2007/0112630 A1 | 5/2007 | Lau et al. | |
| 2007/0149114 A1 | 6/2007 | Danilenko et al. | |
| 2007/0244750 A1 | 10/2007 | Grannan et al. | |
| 2009/0254824 A1 | 10/2009 | Singh | |
| 2009/0313014 A1* | 12/2009 | Shin | G10L 15/22 704/235 |
| 2010/0280641 A1 | 11/2010 | Harkness et al. | |
| 2011/0063503 A1 | 3/2011 | Brand et al. | |
| 2011/0173080 A1 | 7/2011 | Kutsumi et al. | |
| 2011/0247042 A1 | 10/2011 | Mallinson et al. | |
| 2014/0281986 A1* | 9/2014 | Hsu | G11B 27/031 715/716 |

FOREIGN PATENT DOCUMENTS

| | | |
|---|---|---|
| EP | 1356387 | 10/2003 |
| WO | WO2001050296 | 7/2001 |
| WO | WO2005043790 | 5/2005 |
| WO | WO2009005865 | 1/2009 |
| WO | WO2010087396 | 8/2010 |

* cited by examiner

METHOD AND DEVICE FOR PRESENTING CONTENT

CROSS-REFERENCE TO RELATED APPLICATIONS

This application is a continuation of U.S. application Ser. No. 14/369,712 filed Jun. 29, 2014 (U.S. Pat. No. 10,078,690 issuing on Sep. 18, 2018), which claims the benefit under 35 U.S.C 365 of International Application No. PCT/CN2011/085183 filed Dec. 31, 2011, which was published as International Publication No. WO/2013/097239 in English, wherein the content of the above documents are herein incorporated by reference in their entirety.

TECHNICAL FIELD

The present invention relates to data communication, and it more particularly relates to a method and a device for presenting content using a device.

BACKGROUND

TV advertising is the most popular service for national television broadcasters and their local broadcast affiliates. The sale of program time to commercial advertisers who want to promote their products or services is the main source of revenue. It is obvious that the advertisers intend to target those viewers that are likely to be interested in their products or services. Therefore, some additional demographic or location information is collected by television alliance, re-broadcasters and service providers for a limited geographical area. However, this approach still cannot provide personalized advertisement for each individual inside the same geographic regions. Both content providers and advertisers have an incentive to implement better techniques to target and deliver advertising message to specific viewers.

In order to provide personalized advertisement, there are three problems that should be solved: 1) to create user profiles to record the interest and viewing behavior, 2) to identify the advertisement segment and type, herein the advertisement segment means the time period during which the advertisement is present, 3) to trigger the personalized advertisement that is different from the existing advertisement displayed on the TV screen from the broadcaster.

Many existing methods can be used to solve the first problem. The most popular way to obtain a viewer's interests is to track and monitor his daily behavior and/or communications. US2007/0244750 with title "Method and apparatus for selecting advertising" covers a number of the available detecting aspects. U.S. Pat. No. 7,100,183B2 with title "System and method for transmitting and displaying targeted information" uses a completed demographic survey to generate a database named bit mask to control the particular advertising to each viewer.

It is desired to provide personalized advertisement while reducing additional cost to the existing hardware and/or software environment as much as possible.

SUMMARY

According to an aspect of present invention, it is provided a method for triggering an action on a second device. It comprises the steps of obtaining audio of a multimedia content presented on a first device; comparing the obtained audio with reference audio data in a database; if finding the obtained audio exists in the database containing reference audio, determining an action corresponding to the matched reference audio; and triggering the action in the second device.

According to another aspect of present invention, it is provided a device for triggering an action. The device comprises a capturing module for obtaining audio of a multimedia content presented on a different device; a matching module for matching the obtained audio with reference audio from a database; and a processing module for determining, if the matching module matches successfully, an action corresponding to the matched reference audio, and performing the determined action.

It is to be understood that more aspects and advantages of the invention will be found in the following detailed description of the present invention.

BRIEF DESCRIPTION OF THE DRAWINGS

The accompanying drawings illustrate embodiments of the invention together with the description which serves to explain the principle of the invention. Therefore, the invention is not limited to the embodiments. In the drawings.

DETAILED DESCRIPTION

An embodiment of the present invention will now be described in detail in conjunction with the drawings. In the following description, some detailed descriptions of known functions and configurations may be omitted for clarity and conciseness.

According to an embodiment of the present invention, when a viewer is watching a television advertisement on a first device, e.g. TV, the presentation of a particular advertisement is triggered on a second device, e.g. a tablet in a non-intrusive way with regard to the TV broadcasting network. The presentation of the particular advertisement on the tablet is triggered by the following method. The tablet uses voice detection to determine the time for starting presentation of an advertisement on the second device, and uses voice recognition and a user profile to determine which advertisement shall be presented. By using the present embodiment, an advertisement can be provided on the tablet without requiring changes to the existing TV broadcast system. To be specific, the embodiment does not require additional information to be inserted into the existing TV program itself. In addition, the present embodiment can further provide personalized advertisement based on the viewer's profile. It is implemented by e.g. using the viewer's profile to select one among different versions of advertisement to present on the tablet. According to a variant of the present embodiment, if a schedule for advertisement is available, the tablet can obtain the schedule and enable functions of voice detection and recognition of the advertisement on the TV during the time period for the advertisement on the TV as indicated by the schedule, so as to avoid power waste compared to the method that always keeps the functions of voice detection and recognition enabled.

Figure 1:
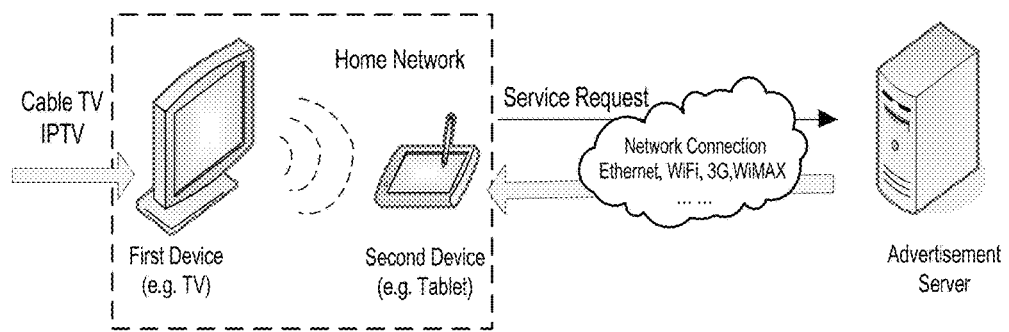
FIG. 1 is a diagram showing a system for providing advertisement on a second device according to the embodiment of present invention.

FIG. 1 is a diagram showing a system for providing advertisement on a second device according to the embodiment of present invention. The system comprises a first device, a second device and an advertisement server. The first device is the SD/HD (standard definition/high definition) or 3D TV set with cable or IPTV connection for receiving and presenting SD/HD content. The second device is a portable device with touch screen input, audio input interface (e.g. microphone) and IP connection to the Internet, the IP connection capability is provided either through wired network interface (e.g. Ethernet) or wireless network interface (e.g. WiFi, 2G/3G, WiMAX, Long Term Evolution (LTE)). In this example, the second device is a tablet, e.g. IPad from Apple. The advertisement server is located in the back end of the network, and it can be operated by a broadcaster that provides the cable TV or IPTV service, or an independent 3rd party content provider. The advertisement server provides at least two categories of data, one is data used for detecting the TV advertisement, e.g. data named sample advertisement index, the sample advertisement index is an audio and/or video segment of the latest advertisement being displayed on the TV in a recent period of time (e.g. one month); the other is the alternative advertisement content which is a different version of the advertisement for the same product or service. It is very common that the producer publishes more than one version of the advertisement for its product(s), for example, one version is focused on the feature description, and the other version is represented by cartoon. Besides, the advertisement server can store other advertisement relating information such as key words, slogan, and advertisement schedule for a given channel etc. Such information can be used to assist the second device to improve the efficiency when detecting and identifying an advertisement being displayed on the TV.

Figure 2:
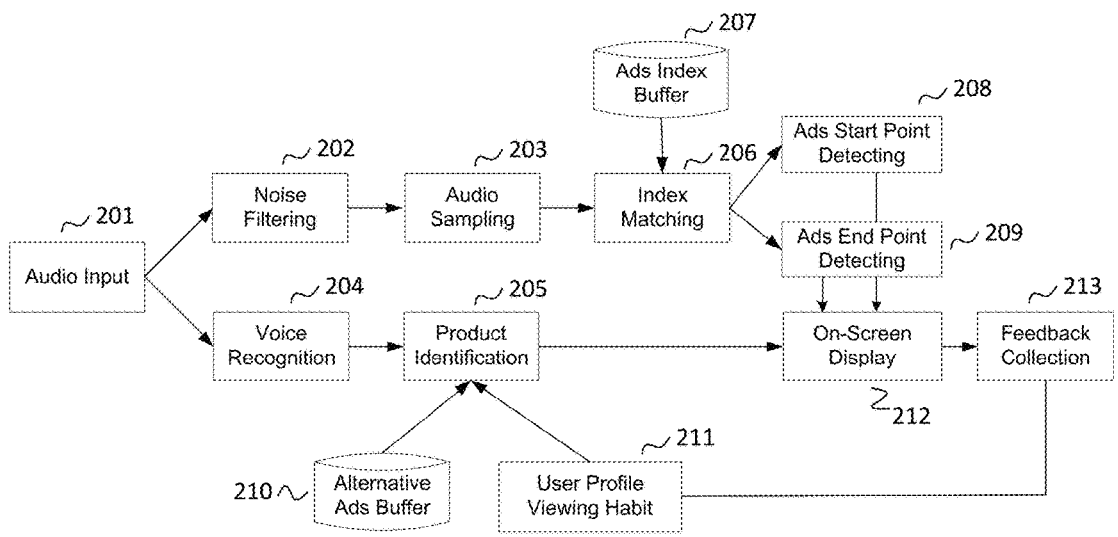
FIG. 2 is a diagram showing a working flow for providing personalized advertisement according to the embodiment of present invention.

FIG. 2 is a diagram showing a working flow for providing personalized advertisement according to the embodiment of present invention.

In the block 201, the tablet uses the microphone to get audio input from the advertisement sound on the TV.

The blocks 202, 203, 206 and 207 are used to detect the starting or ending of the advertisement on the TV by using a matching method. In order to eliminate the effect of background noise on the matching method, the block 202 is used to filter the background noise. Herein, the background noise means the sound from sound resource other than the TV loudspeaker. Many existing noise filtering techniques can be used, and they are quite commonly used in microphone input devices such as voice recorder, telephone and cell phone etc. to eliminate the background noise. The block 207 is used to store an advertisement index used as referenced sampled data, which can be obtained from the content provider. The content provider generates it by sampling the audio track of the TV advertisement in a fixed frequency and recording amplitude of samples. For example, if the sampling frequency is 1K Hz, the audio track will be sampled 1000 times per second and 1000 amplitude values will be recorded. It is known that FM radio uses a sample rate of 22.05 KHz, CD quality uses 44 KHz and DVD audio uses 48 KHz. The purpose of using such high sampling frequency is to help improve the acoustical quality during the playback of music or audio. However, in the sampling function of the present embodiment, there is no need to sample with such high rate because the goal of sampling is to match between the sampled data generated by the block 203 and at least one set of referenced sampled data in the block 207. Herein, the at least one set of referenced sampled data is organized in the form of a table. Each record or entry in the table contains one set of referenced sampled data. And a set of referenced sampled data corresponds to a portion of audio track of the TV advertisement, e.g. the beginning portion (e.g. 2 second) of the TV advertisement or its ending portion. In this embodiment, the block 206 of index matching uses a matching method, which will be described below after the introduction of the FIG. 2, to match sampled data generated by the block 203 with the same sampling frequency as that used by the content provider with the at least one set of referenced sampled data from the block 207, so as to indentify the starting of the TV advertisement as indicated by the block 208 and the ending of the TV advertisement as indicated by the block 209. The identification of the starting or the ending can be optionally displayed on the tablet for the user's information according a variant implementation, and can be used to trigger other events. In this embodiment, the identification of the starting is used to trigger the tablet to display an advertisement, which is chosen by the blocks 204, 205 and 211. In a variant of the present embodiment, the identification of the ending is used to terminate the display of the advertisement on the tablet.

The block 204 uses voice recognition techniques to do speak-to-text (STT) processing of the captured audio input from the block 201, and its output result is a slogan or key words (e.g. brand name) for the advertisement shown on the TV. The block 205 of product identification firstly uses the result from the block 204 to search the block 210 of the alternative ads buffer, which is used to store advertisements associated with respective key words, to check whether an advertisement in the block 201 is available for the same product or service. Note that more than one advertisement can satisfy the search, e.g. several different versions can be found. In this case, the user profile is used to select one from all candidate advertisements that matches the user profile and viewing behavior well.

The block 211 of user profile/viewing habit is used to store user profiles and viewing behaviors. Besides, after the viewing of an alternative advertisement on the tablet, the block 213 enables the user to give some feedback for it such as ranking, voting, comments etc . . . by prompting and receiving user input on the tablet. The feedback information will be sent to the user profile module for dynamic updating and optimizing.

Figure 3:
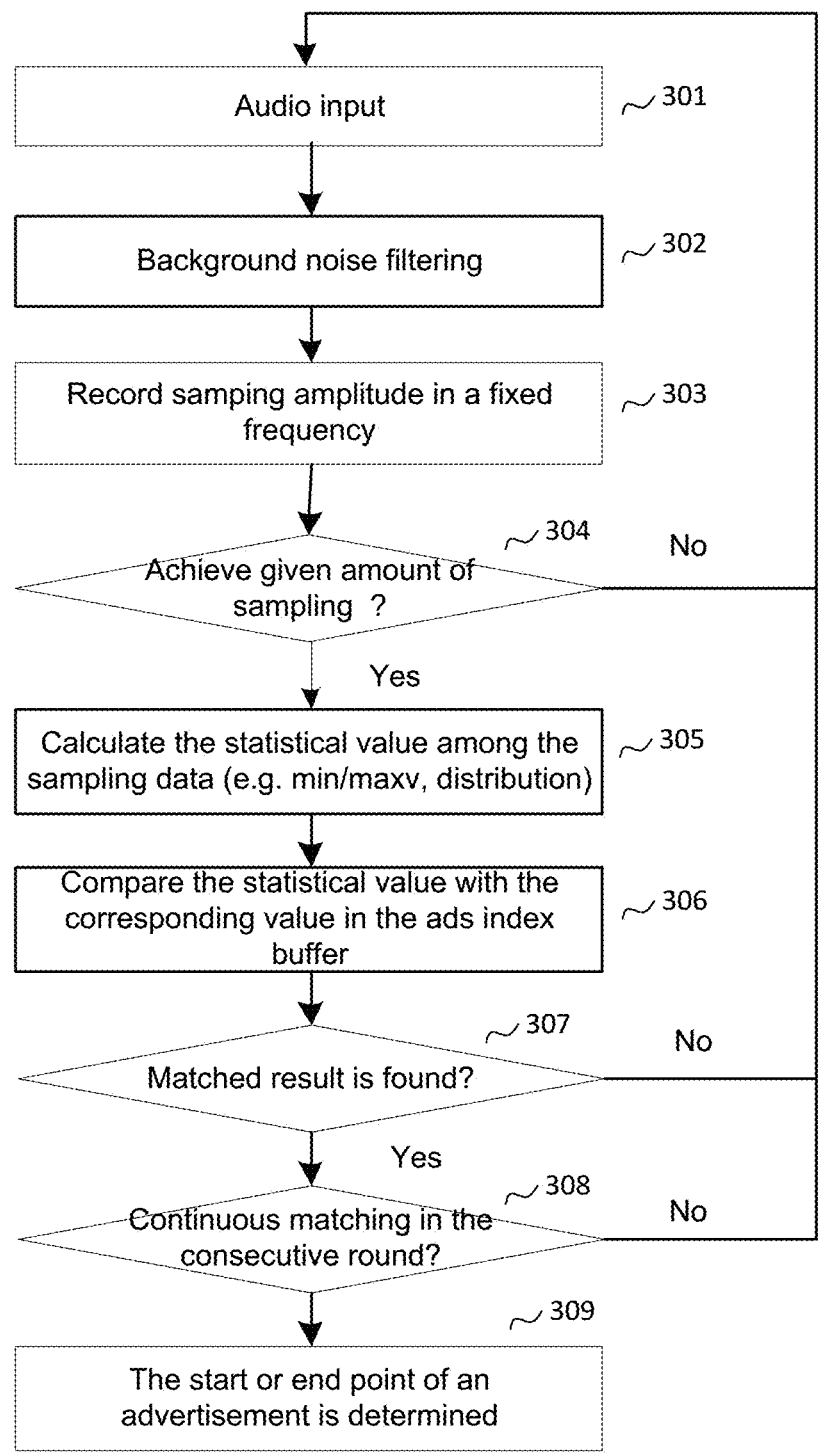
FIG. 3 is a flow chart illustrating a method for matching according to the embodiment of present invention.

FIG. 3 is a flow chart illustrating a method for matching audio according to the embodiment of present invention. It is an iterative function for continuous judgment and determination.

In the steps 301 and 302, audio input is captured and background noise is filtered.

In the step 303, audio input after filtering the noise is sampled in a fixed frequency and sampled values are recorded. The step 304 determines if a predefined number of sampled values are obtained, for example, assuming the sampling rate is 1000 Hz, the predefined amount of the sampling values can be set as 500, therefore judgment or determination can be made twice a second. In the step 305, at least one representative value of the recorded sampling values, e.g. at least one statistical value of the recorded sampling values, is calculated, and compared with referenced values, which is calculated in advance by using the same calculating method as the steps 303, 304 and 305 and is stored in the ads index buffer. In this example, maximal/ minimal value and distribution information are used. It shall be noted that other types of statistical values can also be used so as to reduce the comparison complexity and improve efficiency. Further, as shown in the steps 308 and 309, in order to decrease the error report which may be caused by similar audio files of TV programs, more than one matching is used, and only if the matching results in a consecutive comparing round are positive, then a start or end point of an advertisement will finally be determined.

Figure 4:
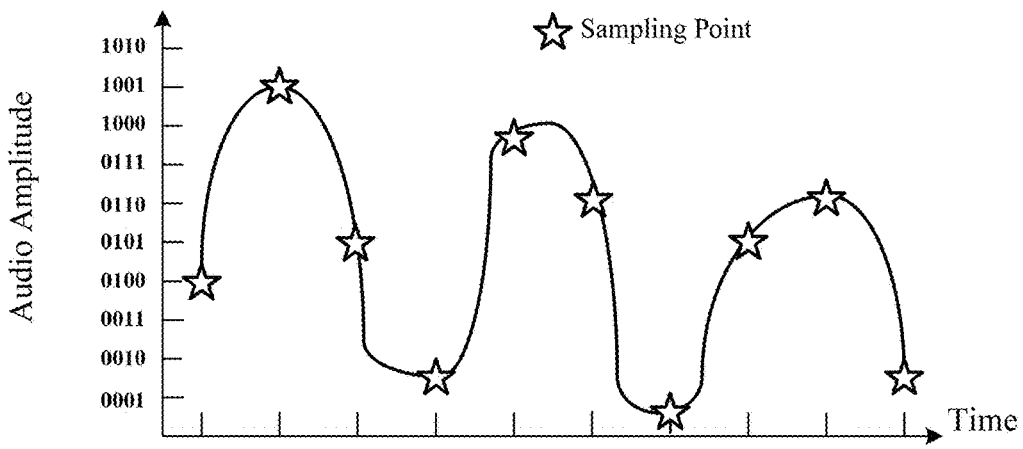
FIG. 4 is a diagram showing a captured audio input with sampled values according to the embodiment of present invention.

FIG. 4 is a diagram showing a captured audio input with sampled values according to the embodiment of present invention. The vertical axis represents the amplitude, and the amplitude value is quantified by equal intervals coded by values between, "0001" to "1010". It shall be noted that other types of quantification, e.g. using intervals of different height can also be used. As can be seen, the audio input is sampled 10 times as indicated by the star mark. The ten amplitude values are stored in a table as shown below.

TABLE 1 amplitude value table

| Sequence | Audio Amplitude |
|---|---|
| 1 | 0100 |
| 2 | 1001 |
| 3 | 0101 |
| 4 | 0010 |
| 5 | 1000 |
| 6 | 0110 |
| 7 | 0001 |
| 8 | 0101 |
| 9 | 0110 |
| 10 | 0010 |

Then statistics values, such as max value, min value and distribution information are determined based on the ten amplitude values as shown below. It shall be noted that other statistical values can be used and other types of distribution information can be used.

TABLE 2 statistical value table
Statistics (10 sampling points)

| Max Value | 1001 |
|---|---|
| Min Value | 0001 |
| Distribution | |
| 0001~0101 | 6 points |
| 0110~1010 | 4 points |

Although above tables 1 and 2 show how the tablet samples the audio input and calculates the statistics values, it shall be noted that the content provider uses the same to obtain the referenced data from each TV advertisement.

Since the response time of the tablet to detect starting/ending of a TV advertisement plays an important role in the user's viewing experience, it is desirable to determine the starting of the TV advertisement as soon as possible after capturing audio of the TV advertisement. Therefore the time duration for capturing audio of the TV advertisement so as to calculate statistical values varies with the concrete implementation of present invention, and shall be determined on a case by case basis.

According to a variant of the present embodiment, it is possible to include information for assisting the selection of advertisement for the tablet, such as key words, slogan etc. in the table containing the at least one set of referenced sampled data. In this case, the block 204 is not necessary, and the block 205 will use the information for assisting the advertisement selection from the block 206.

One disadvantage brought by above the embodiment is power consumption, because the tablet must be kept running to capture and analyze the audio from the TV continuously, even in the long period time of a TV soap opera or in a live sports game. It wastes the CPU and battery resources of the tablet. According to a second, a 3rd party advertisement server is introduced to provide an advertisement segment determining function, and the server communicates with the STB of the user so as to get information about which channel the user is watching. When an advertisement is detected by the server, a message is sent to the tablet to notify that the advertisement session is beginning; when the advertisement session is over, a terminating message is sent so as to allow the tablet to switch to sleep/idle state to save power. Besides, the 3rd part advertisement server can include information for assisting the selection of advertisement for the tablet in its message, such as key words, slogan. Such information can be manually input, or automatically derived from the EPG (Electronic Program Guide).

Figure 5:
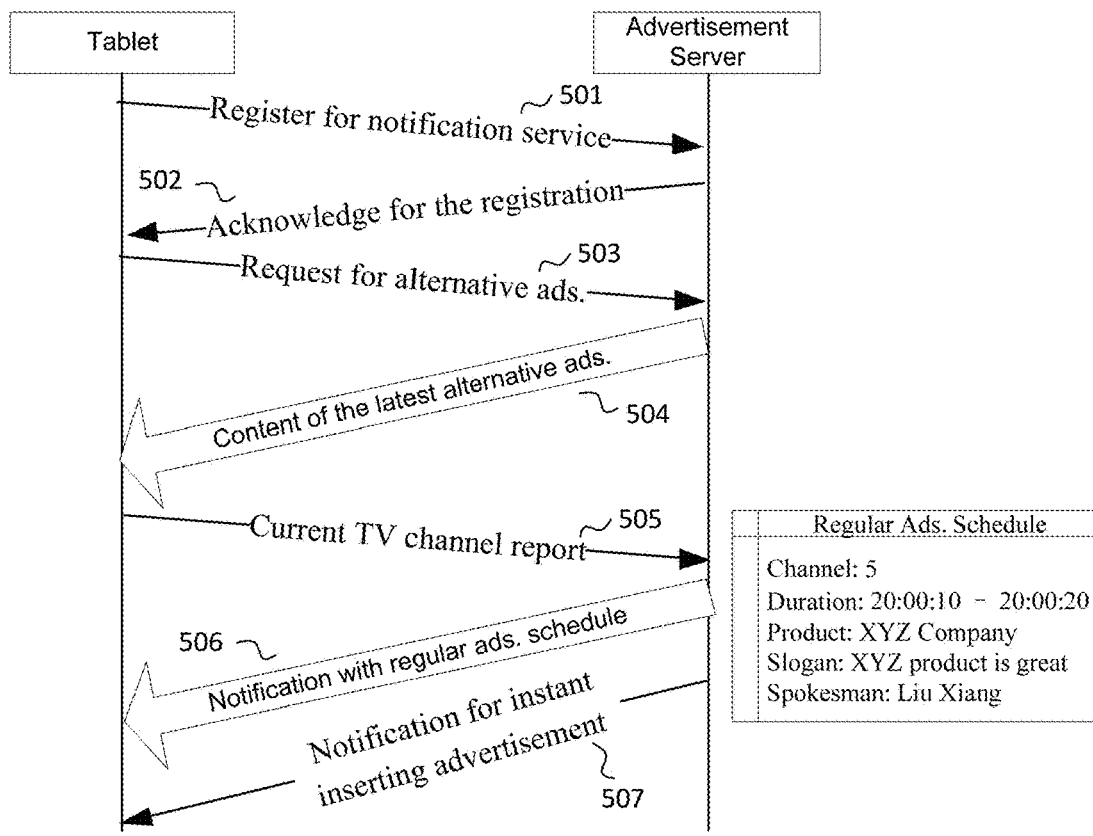
FIG. 5 a message sequence chart illustrating messages exchanged between the tablet and the advertisement server according to the embodiment of present invention.

FIG. 5 is a message sequence chart illustrating messages exchanged between the tablet and the advertisement server when the notification service is available according to the second embodiment. In this example, the advertisement segment determining function is integrated into the advertisement server, and all possible alternative advertisements to be presented on the tablet are stored in the tablet before one of them is presented, so as to eliminate the lag for starting presenting it on the tablet. In the steps 501 and 502, the tablet registers itself with the server and the server acknowledges such registration. After registration, the tablet requests all advertisements or some advertisements and receives them from the server as shown in the steps 503 and 504. It shall be noted that the step 504 can be carried out periodically. Either TCP or UDP protocol is selected as the transmission protocol for the advertisements depending on the quality of the network. In the step 505, the tablet reports the current TV channel information (e.g. channel ID or channel name); such information can be obtained by several ways, e.g. manual input, or establishment of a connection, e.g. a wireless connection, between the tablet and the set top box to retrieve it. After receiving the channel report from the tablet, the server responds with an advertisement schedule including the information of duration (starting and ending times), product or service names, slogan, type etc . . . in the step 506. As shown in the FIG. 5, an advertisement with a given slogan is scheduled to play in channel 5 from 20:00:00 to 20:00:10, the brand spokesman is a Chinese sport star named "Liu Xiang" The tablet will use the advertisement schedule to display a chosen advertisement to the user. Besides, the server can send instant notification for instructing the tablet to present an advertisement as shown in the step 507. The instant notification is useful for a live program. In a variant, the advertisement server broadcasts the advertisement schedule by different channels to different multicast groups of receivers. The tablet just needs to join the corresponding multicast group for receiving the schedule of the channel that the user is watching. Therefore, the step 505 is not necessary in this case.

According to a variant, the second device is a stationary device.

According to a variant, the table containing the referenced sampled data for matching audio further comprises a corresponding relation between the referenced sampled data and advertisement for the tablet. In this case, a user profile is not necessary. The tablet will use the advertisement corresponding to the record of matched referenced sampled data for presentation.

It shall be noted that the present invention can be applied to other systems and content other than advertisement. According to a variant, the content that is presented by the first device is an audio or a portion of a video, e.g. movie. A portion of its audio track is used to trigger the second device to present a certain audio/video file, and/or perform a certain action, e.g. turning on/off the light.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations shall fall in the scope of the invention.

The invention claimed is:

1. A method comprising:
   obtaining, by a first device, audio of multimedia content presented on a second device;
   sampling, by the first device, the audio at a sampling frequency;
   searching, by the first device, a database for a reference audio using the sampling frequency of the sampled audio as search criteria;
   when the reference audio is found in the database, determining, by the first device, an action corresponding to the reference audio, wherein the reference audio is found in the database at least based on a matching of the sampling frequency of the audio and the reference audio; and
   performing, by the first device, the action in the first device.

2. The method of claim 1, further comprising:
   storing, by the first device, at least one user profile; and
   using, by the first device, the stored at least one user profile to select the action among two or more candidate actions corresponding to the reference audio.

3. The method of claim 1, wherein the action comprises at least one of:
   starting presenting the multimedia content;
   stopping presenting the multimedia content; and
   carrying out a control action on a physical device, said control action being one of turning on or off said physical device.

4. The method of claim 3, further comprising:
   using, by the first device, voice recognition on the obtained audio to determine the multimedia content to be presented, when the action is to start presenting multimedia content; and
   using a result of the voice recognition to determine the multimedia content to present.

5. The method of claim 1, further comprising:
   using, by the first device, a user profile to determine the action among two or more candidate actions so as to satisfy a user preference.

6. The method of claim 5, further comprising:
   providing, by the first device, a user interface for collecting user feedback after the action is performed so as to update the user profile.

7. A device comprising:
   a memory;
   at least one processor coupled to the memory, wherein the at least one processor is configured to:
   obtain audio of multimedia content presented on a different device;
   sample the audio at a sampling frequency; and
   search a database for a reference audio using the sampling frequency of the sampled audio as search criteria;
   when the reference audio is found in the database, determine an action corresponding to the reference audio, wherein the reference audio is found in the database at least based on a matching of the sampling frequency of the audio and the reference audio; and
   perform the determined action.

8. The device of claim 7, wherein the at least one processor is further configured to:
   store at least one user profile,
   use the stored user profile to select the action among two or more candidate actions corresponding to the reference audio.

9. The device of claim 7, wherein the action comprises at least one of:
   starting presenting the multimedia content;
   stopping presenting the multimedia content; and
   carrying out a control action on a physical device such as turning on or off said physical device.

10. The device of claim 9, wherein the at least one processor is further configured to:
    use voice recognition on the obtained audio to determine the multimedia content to be presented by the device, when the action is to start presenting multimedia content on the device; and
    use a result of the voice recognition to determine the multimedia content to present on the device.

11. The device of claim 7, wherein the at least one processor is further configured to:
    use a user profile to determine the action among two or more candidate actions so as to satisfy a user preference.

12. The device of claim 11, wherein the processor is further configured to:
    provide a user interface for collecting user feedback after the action is performed so as to update the user profile.

* * * * *